United States Patent
Li (10) Patent No.: US 12,362,814 B2
(45) Date of Patent: Jul. 15, 2025

(54) DATA TRANSMISSION METHOD, DATA TRANSMISSION APPARATUS, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 370 days.

(21) Appl. No.: 17/998,284

(22) PCT Filed: May 9, 2020

(86) PCT No.: PCT/CN2020/089383
§ 371 (c)(1),
(2) Date: Nov. 9, 2022

(87) PCT Pub. No.: WO2021/226746
PCT Pub. Date: Nov. 18, 2021

(65) Prior Publication Data
US 2023/0170972 A1 Jun. 1, 2023

(51) Int. Cl.
*H04B 7/06* (2006.01)
*H04W 72/1268* (2023.01)
*H04W 76/20* (2018.01)
*H04W 80/02* (2009.01)

(52) U.S. Cl.
CPC ...... *H04B 7/0695* (2013.01); *H04W 72/1268* (2013.01); *H04W 76/20* (2018.02); *H04W 80/02* (2013.01)

(58) Field of Classification Search
CPC .................................................. H04B 7/0695
See application file for complete search history.

(56) References Cited

U.S. PATENT DOCUMENTS

| | | | |
|---|---|---|---|
| 2017/0265184 A1* | 9/2017 | Liu | H04W 56/001 |
| 2019/0182682 A1* | 6/2019 | Kim | H04W 74/08 |
| 2019/0253122 A1* | 8/2019 | Yang | H04B 7/04 |
| 2019/0261338 A1 | 8/2019 | Akkarakaran et al. | |
| 2019/0312698 A1* | 10/2019 | Akkarakaran | H04W 72/046 |
| 2020/0059290 A1* | 2/2020 | Pan | H04B 7/0857 |
| 2020/0106168 A1* | 4/2020 | Hakola | H04B 7/0695 |
| 2020/0120584 A1* | 4/2020 | Yi | H04W 74/0833 |

(Continued)

FOREIGN PATENT DOCUMENTS

| | | |
|---|---|---|
| CN | 109983797 A | 7/2019 |
| CN | 110393033 A | 10/2019 |

(Continued)

OTHER PUBLICATIONS

European Patent Office, Extended European Search Report issued in Application No. 20935729.2 dated Jan. 1, 2024, 8 pages.

(Continued)

*Primary Examiner* — Fahmida S Chowdhury
(74) *Attorney, Agent, or Firm* — Finnegan, Henderson, Farabow, Garrett & Dunner, L.L.P.

(57) ABSTRACT

A method for data transmission, includes: determining a default uplink transmission beam, wherein the default uplink transmission beam comprises one or more uplink transmission beams; and performing data transmission based on the default uplink transmission beam.

16 Claims, 3 Drawing Sheets

(56) References Cited

U.S. PATENT DOCUMENTS

| | | | | |
|---|---|---|---|---|
| 2020/0195334 A1* | 6/2020 | Zhou | .................... | H04L 5/0053 |
| 2020/0322930 A1* | 10/2020 | Zhou | .................... | H04L 5/0053 |
| 2021/0234752 A1* | 7/2021 | Matsumura | .......... | H04B 7/0695 |
| 2021/0289461 A1* | 9/2021 | Zhang | ................ | H04W 56/001 |
| 2021/0352645 A1* | 11/2021 | Huang | ................ | H04B 7/0695 |
| 2023/0101444 A1* | 3/2023 | Yuan | ................... | H04B 7/0695 |
| | | | | 375/267 |
| 2023/0170972 A1* | 6/2023 | Li | ....................... | H04B 7/0695 |
| | | | | 370/329 |

FOREIGN PATENT DOCUMENTS

| | | |
|---|---|---|
| CN | 110519844 A | 11/2019 |
| CN | 110933749 A | 3/2020 |

OTHER PUBLICATIONS

The First Office Action for Chinese Application No. 202080000990.2, dated Sep. 9, 2022, 17 pages.
International Search Report and Written Opinion for PCT Application No. PCT/CN2020/089383, issued Feb. 8, 2021.
Examination report for India Application No. 202247069071, issued on Jan. 12, 2023, 7 pages.
LG Electronics: "Remaining issues on beam management", 3GPP TSG RAN WG1 Meeting #93, R1-1806610, Busan, Korea, May 21-25, 2018, 5 pages.
Qualcomm Incorporated: "Beam management for NR", 3GPP TSG-RAN WG1 #94bis, R1-1811633, Chengdu, China, Oct. 8-12, 2018, 13 pages.

* cited by examiner

DATA TRANSMISSION METHOD, DATA TRANSMISSION APPARATUS, AND STORAGE MEDIUM

CROSS REFERENCE TO RELATED APPLICATIONS

This application is the U.S. national phase application based on International Application No. PCT/CN2020/089383, filed May 9, 2020, the content of which is incorporated herein by reference for all purposes.

TECHNICAL FIELD

The disclosure relates to a field of communication technologies, and more particularly to a method and an apparatus for data transmission, and a storage medium.

BACKGROUND

New Radio (NR) generally uses beam-based transmission and reception to ensure a coverage range and suppress path loss.

For the beam-based reception, a network device (such as a base station) informs a terminal of a beam to be used for reception with indicating a status of a transmission configuration indication (TCI) through signaling, thus. For beam-based transmission of a physical uplink shared channel (PUSCH), the network device (such as the base station) indicates a direction of an uplink beam with indicating a sounding reference signal (SRS) resource indication through a downlink control information (DCI) signaling. SRS corresponding to the SRS resource indication indicated by the DCI signaling is one of a plurality of SRS resources configured by a radio resource control (RRC) signaling. Each SRS resource in the plurality of SRS resources is configured with Spatial relation information (spatialrelationinfo), which corresponds to a synchronization signal block (SSB) identifier (ID), a non-zero power channel state information reference signal (CSI-RS) ID or SRS ID. It may also be understood that a direction of a transmission beam of the PUSCH is the same as that of the transmission beam of the SRS indicated by the spatialrelationinfo corresponding to the SRS resource indication, or the same as that of the transmission beam corresponding to a reception beam of the SSB or CSI-RS indicated by the spatialrelationinfo corresponding to the SRS resource indication.

SUMMARY

The present disclosure provides a method and an apparatus for data transmission, and a storage medium.

According to a first aspect according to embodiments of the present disclosure, there is provided a method for data transmission. The method includes: determining a default uplink transmission beam, in which the default uplink transmission beam includes one or more uplink transmission beams; and performing data transmission based on the default uplink transmission beam.

According to a second aspect according to embodiments of the present disclosure, there is provided an apparatus for data transmission. The apparatus includes a processor and a memory. The memory is configured to store instructions executable by the processor. The processor is configured to determine a default uplink transmission beam, in which the default uplink transmission beam includes one or more uplink transmission beams; and perform data transmission based on the default uplink transmission beam.

According to a third aspect according to embodiments of the present disclosure, there is provided a non-temporary computer-readable storage medium. When instructions stored in the storage medium are executed by a processor of a mobile terminal or a network device, the mobile terminal or the network device is caused to implement: determining a default uplink transmission beams, in which the default uplink transmission beam includes one or more uplink transmission beams; and performing data transmission based on the default uplink transmission beam.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the disclosure as described in the appended claims.

Figure 1:
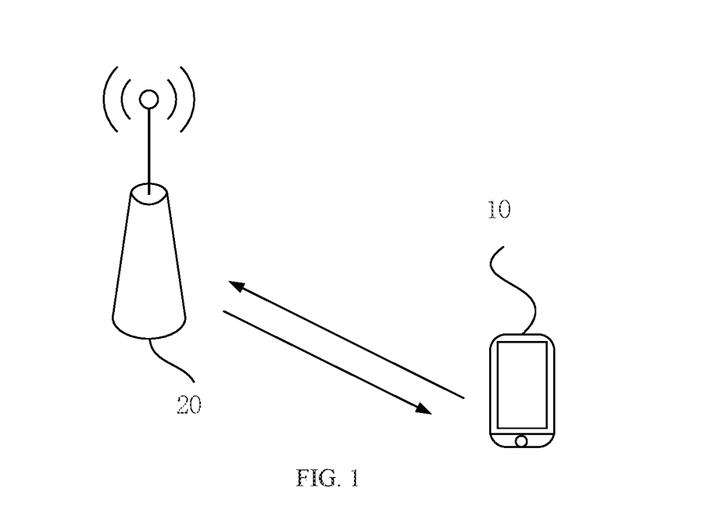
FIG. 1 is a schematic diagram illustrating a communication system architecture according to an exemplary embodiment.

A method for data transmission provided by an embodiment of the present disclosure can be applied to a wireless communication system illustrated in FIG. 1. Referring to FIG. 1, the wireless communication system may include a terminal 10 and a network device 20. The terminal 10 connects with the network device 20 through wireless resources, and performs data transmission and reception.

It can be understood that the wireless communication system illustrated in FIG. 1 is only a schematic description. The wireless communication system may also include other network devices, such as a core network device, a wireless relay device, a wireless backhaul device, etc., which are not illustrated in FIG. 1. An embodiment of the present disclosure does not limit the number of the network devices and the terminals included in the wireless communication system.

It can be further understood that the wireless communication system in an embodiment of the present disclosure is a network providing a wireless communication function.

The wireless communication system can adopt different communication technologies, such as code division multiple access (CDMA), broadband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. The networks, according to capacity, rate, delay and other factors of different networks, can be classified into 2G (generation) network, 3G network, 4G network or future evolution networks, such as 5G network, which can also be called New Radio (NR). For the convenience of description, the wireless communication network is sometimes referred to as network in the present disclosure.

Further, the network device in the present disclosure can also be called as a wireless access network device. The wireless access network device may be a base station, an evolved node B (base station), a Femto-cell, an access point (AP) in a wireless fidelity (WIFI) system, a wireless relay node, a wireless backhaul node, a transmission point (TP), or a transmission and reception point (TRP), etc., or may also be a gNB in the NR system, or may also be a component or part of the equipment constituting the base station. The network device may be an on-board device for an Internet of Vehicles (V2X) communication system. It should be understood that an embodiment of the present disclosure does not limit the concrete technology and concrete device form used by the network device.

Further, the terminal involved in the present disclosure may also be called as a terminal device, a user equipment (UE), a mobile station (MS), a mobile terminal (MT), etc., which is a device for providing voice and/or data connectivity to a user. For example, the terminal may be a handheld device, a vehicle mounted device, etc. with a wireless connection function. Presently, examples of some terminals are as follows: a mobile phone, a pocket personal computer (PPC), a handheld computer, a personal digital assistant (PDA), a notebook computer, a tablet computer, a wearable device, or an on-board device. In addition, the terminal device may be an on-board device for an Internet of Vehicles (V2X) communication system. It should be understood that an embodiment of the present disclosure does not limit the concrete technology and concrete device form used by the terminal.

In the present disclosure, data transmission is performed between the network device and the terminal based on beam. During a progress of beam-based data transmission, the network device (such as the base station) may indicate a TCI status or spatial relation information through signaling, thus indicating a reception beam or a transmission beam of the terminal.

For beam-based PUSCH transmission, the network device indicates a direction of an uplink beam by indicating a SRS resource indication through DCI signaling. In a process of the beam-based PUSCH transmission of the terminal, there may be a situation that the terminal cannot obtain the uplink beam configured by the network device, for example, no beam information indicated by the DCI signaling, or failure to decode an uplink transmission beam by the terminal resulting from a too small time interval between the DCI signaling and the uplink transmission. However, the terminal fails to determine the accurate uplink transmission beam, which may cause mismatch between the transmission beam of the terminal and the reception beam of the network device, resulting in transmission failure. For example, in a case that the terminal has a plurality of antenna panels, the network device may configure a plurality of uplink transmission beams for the terminal to perform the uplink transmission simultaneously when the plurality of panels are activated simultaneously and capable of performing transmission simultaneously. When the terminal cannot obtain the uplink transmission beam configured by the network device, how to ensure an accuracy of receiving the uplink transmission is a technical problem to be solved.

An embodiment of the present disclosure provides a method for data transmission. In the method, a default uplink transmission beam is determined, and data transmission is performed based on the default uplink transmission beam, which may avoid the problem of uplink transmission reception failure resulting from inability to determine the uplink transmission beam for performing the data transmission when the terminal cannot obtain the uplink transmission beam configured by the network device, may further ensure that the uplink transmission beam of the terminal matches the uplink reception beam of the network device, ensure the accuracy of receiving the uplink transmission, and improve throughput.

Figure 2:
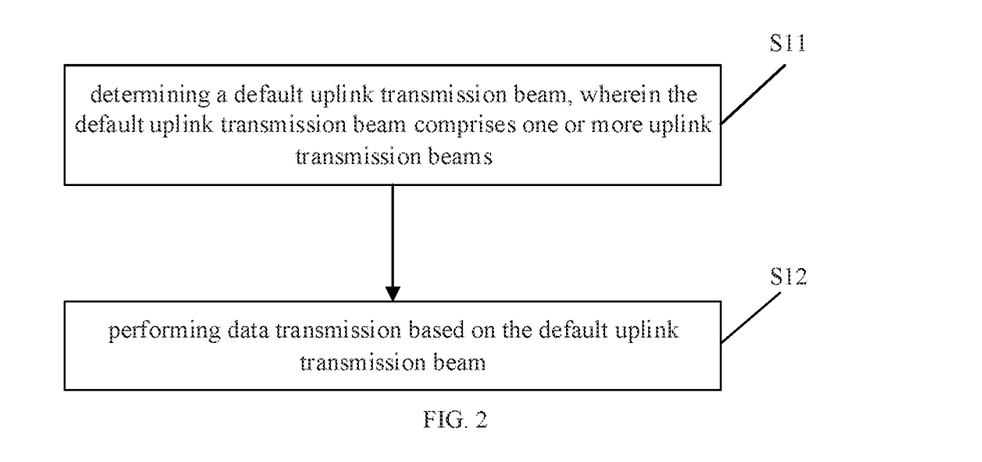
FIG. 2 is a flowchart illustrating a method for data transmission according to an exemplary embodiment.

FIG. 2 is a flowchart illustrating a method for data transmission according to an exemplary embodiment. As illustrated in FIG. 2, the method is applied in a terminal or a network device, and may include the following steps.

At step S11, a default uplink transmission beam is determined.

The default uplink transmission beam in an embodiment of the present disclosure may be understood as an uplink transmission beam used by the terminal and the network device by default for uplink PUSCH transmission. The default uplink transmission beam may include one or more uplink transmission beams.

In an embodiment, the default uplink transmission beam may be determined based on uplink beam information. The uplink beam information may be indicated by IE spatialrelationinfo, that is, the IE spatialrelationinfo is continued to use. The uplink beam information may also be indicated by uplink (UL) TCI status or TCI status, that is, a new IE: UL TCI or TCI is used to indicate the uplink transmission beam.

The following embodiments of the present disclosure take the uplink beam information being indicated by spatialrelationinfo as an example for explanation. It may be understood that the uplink beam information may also be indicated by UL TCI or TCI.

In step S12, data transmission is performed based on the default uplink transmission beam.

It can be understood that in an embodiment of this disclosure, both the terminal and the network device is required to determine the default uplink transmission beam used by the terminal for uplink PUSCH transmission. The terminal determines the default uplink transmission beam, and the network device determines an uplink reception beam for receiving when the terminal transmits using the default uplink transmission beam.

In an embodiment of the present disclosure, after determining the default uplink transmission beam used by the terminal for the uplink PUSCH transmission, the terminal may perform the uplink beam transmission based on the default uplink transmission beam. The network device may determine the corresponding reception beam for beam reception based on the default uplink transmission beam after determining the default uplink transmission beam used by the terminal for the uplink PUSCH transmission. Furthermore, the present disclosure performs the data transmission based on the default uplink transmission beam, which may ensure that the uplink transmission beam of the terminal matches the uplink reception beam of the network device, and ensure the accuracy of receiving the uplink transmission, and improve the throughput.

Embodiments of the present disclosure will describe a process of determining the default uplink transmission beam involved in embodiments of the present disclosure in combination with practical applications.

In an implementation, the default uplink transmission beam of the terminal in an embodiment of the present disclosure is determined based on one or more transmission beams that correspond to one or more reference signals corresponding to one or more uplink beam information sets configured by one or more radio resource control (RRC) signalings.

The default uplink transmission beam has a correspondence with uplink beam information in the one or more uplink beam information sets configured by the one or more RRC signalings. For example, the default uplink transmission beam has a correspondence with the uplink beam information with a minimum index in the one or more uplink beam information sets configured by the one or more RRC signalings. In an example, a default uplink transmission beam of the terminal may be a transmission beam that corresponds to a reference signal corresponding to spatialrelationinfo with the minimum index, such as spatialrelationinfo #0, among a plurality of pieces of spatialrelationinfo configured by a RRC signaling. Certainly, embodiments of the present disclosure are not limited thereto. The default uplink transmission beam may also have a correspondence with uplink beam information with other index in the one or more uplink beam information sets configured by the one or more RRC signalings.

In an embodiment of the present disclosure, when the terminal includes a plurality of panels, default uplink transmission beams of respective panels among the plurality of panels may be determined based on different uplink beam information sets configured by different RRC signalings, or may be determined based on uplink beam information sets configured by a same RRC signaling.

On the one hand, when the default uplink transmission beams of respective panels among the plurality of panels are determined based on different uplink beam information sets configured by different RRC signalings, the default uplink transmission beam is one or more transmission beams that correspond to one or more reference signals corresponding to one or more pieces of uplink beam information in an RRC index-minimum uplink beam information set. The RRC index-minimum uplink beam information set includes one piece of uplink beam information with the minimum index in each of uplink beam information sets. In an example, the spatialrelationinfo of the plurality of panels of the terminal may be configured using different RRC signaling. When the terminal has one default uplink transmission beam, it is required to configure which panel the default uplink transmission beam of the terminal corresponds to. When the terminal has the plurality of default uplink transmission beams (such as two default uplink transmission beams), it is required to configure that a transmission beam that corresponds to a reference signal corresponding to the spatialrelationinfo with a minimum numbering for each panel of the terminal is the default uplink transmission beam, that is, each panel corresponds to spatialrelationinfo #0 configured by one RRC signaling.

On the other hand, when the default uplink transmission beams of respective panels among the plurality of panels are determined based on the uplink beam information sets configured by the same RRC signaling, the default uplink transmission beam is one or more transmission beams that correspond to one or more reference signals corresponding to one or more pieces of uplink beam information with the minimum index configured by the RRC signaling. In an example, the spatialrelationinfo of the plurality of panels of the terminal are configured using the same RRC signaling. When the terminal has one default uplink transmission beam, the default uplink transmission beam is a transmission beam that corresponds to a reference signal corresponding to the spatialrelationinfo with the minimum index, such as spatialrelationinfo #0, among the plurality of pieces of spatialrelationinfo of the plurality of panels configured by the RRC signaling. When the terminal has a plurality of default uplink transmission beams, such as two default uplink transmission beams corresponding one by one with two panels, the two default uplink transmission beams are two pieces of spatialrelationinfo with the minimum index, such as spatialrelationinfo #0 and spatialrelationinfo #1, among the plurality of pieces of spatialrelationinfo of two panels configured with the RRC signaling. And spatialrelationinfo #0 and spatialrelationinfo #1 respectively correspond to different panels in two panels.

In another implementation, the default uplink transmission beam of the terminal in an embodiment of the present disclosure is determined based on one or more transmission beams that correspond to one or more reference signals corresponding to one or more candidate uplink beam information sets activated by one or more media access control (MAC) signalings.

The default uplink transmission beam has a correspondence with uplink beam information in the one or more candidate uplink beam information sets activated by the one or more MAC signalings. For example, the default uplink transmission beam has a correspondence with the uplink beam information with the minimum index in the one or more candidate uplink beam information sets activated by the one or more MAC signalings. In an example, a default uplink transmission beam of the terminal may be a transmission beam that corresponds to a reference signal corresponding to spatialrelationinfo with the minimum index among the plurality of pieces of spatialrelationinfo activated by a MAC signaling. Certainly, embodiments of this disclosure are not limited thereto. The default uplink transmission beam may also have a correspondence with uplink beam information with other index in the one or more candidate uplink beam information sets activated by the one or more MAC signalings.

In an embodiment of the present disclosure, when the terminal may include a plurality of antenna panels, the default uplink transmission beams of respective panels among the plurality of panels may be determined based on different candidate uplink beam information sets respectively activated by different MAC signalings (the spatialrelationinfo of each panel among the plurality of panels is activated separately), or may also be determined based on candidate uplink beam information sets activated by a same MAC signaling (one MAC signaling activates the spatialrelationinfo of the plurality of panels).

On the one hand, when the default uplink transmission beams of respective panels among the plurality of panels are determined based on different candidate uplink beam information sets respectively activated by different MAC signalings, the default uplink transmission beam is one or more transmission beams that correspond to one or more reference signals corresponding to one or more pieces of uplink beam information in an MAC index-minimum uplink beam information set. The MAC index-minimum uplink beam information set includes one piece of uplink beam information with a minimum index in each of candidate uplink beam information sets. In an example, the spatialrelationinfo of the plurality of panels of the terminal may be activated using different MAC signalings. For example, spatialrelationinfo #3 is uplink beam information with the minimum index in a candidate uplink beam information set activated by the MAC signaling of panel #1, and spatialrelationinfo #5 is uplink beam information with the minimum index in the candidate uplink beam information set activated by the MAC signaling of panel #2. When the terminal has one default uplink transmission beam, it is required to configure which panel the default uplink transmission beam of the terminal corresponds to, that is, it is required to configure whether the terminal uses spatialrelationinfo #3 of panel #1 or spatialrelationinfo #5 of panel #2. When the terminal has the plurality of default uplink transmission beams (for example, two default uplink transmission beams), it is required to configure that a transmission beam that corresponds to a reference signal corresponding to the spatialrelationinfo with a minimum numbering for each panel of the terminal is the default uplink transmission beam, that is, it is required to configure that the terminal uses spatialrelationinfo #3 of panel #1 and spatialrelationinfo #5 of panel #2.

On the other hand, when the default uplink transmission beams of respective panels among the plurality of panels are determined based on the candidate uplink beam information sets activated by the same MAC signaling, the default uplink transmission beam is one or more transmission beams that correspond to one or more reference signals corresponding to one or more pieces of uplink beam information with the minimum index activated by the MAC signaling. In an example, the spatialrelationinfo of the plurality of panels of the terminal are activated using the same MAC signaling. When the terminal has one default uplink transmission beam, the default uplink transmission beam is a transmission beam that corresponds to a reference signal corresponding to the spatialrelationinfo with the minimum index among the plurality of pieces of spatialrelationinfo activated by the MAC signaling. For example, when the MAC signaling activates spatialrelationinfo #3, spatialrelationinfo #5, spatialrelationinfo #6, spatialrelationinfo #8, and so on, one default uplink transmission beam is spatialrelationinfo #3. When the terminal has the plurality of default uplink transmission beams, such as two default uplink transmission beams corresponding one by one with two panels, the two default uplink transmission beams are two pieces of spatialrelationinfo with the minimum index, such as spatialrelationinfo #3 and spatialrelationinfo #5, among the plurality of pieces of spatialrelationinfo of two panels activated by MAC signaling. And spatialrelationinfo #3 and spatialrelationinfo #5 respectively correspond to different panels in two panels.

In another implementation, in an embodiment of the present disclosure, the default uplink transmission beam is determined based on one or more transmission beams that correspond to one or more reference signals corresponding to uplink beam information in a mapping table indicated by a MAC signaling. The uplink beam information in the mapping table indicated by the MAC signaling is uplink beam information corresponding to a minimum codepoint among codepoints corresponding to a plurality of pieces of uplink beam information in the mapping table.

In an example, when the number of pieces of spatialrelationinfo configured by the RRC is relatively large, such as more than N (N may be 8), N (N may be 8) pieces of the spatialrelationinfo among the pieces of spatialrelationinfo are activate by the MAC signaling. When the number of pieces of spatialrelationinfo configured by the RRC signaling is small, such as less than N (N may be 8), the pieces of spatialrelationinfo are not required to activate by the MAC signaling, which is equivalent to that all pieces of spatialrelationinfo provided by the RRC signaling are activated. The MAC signaling may indicate one mapping table, and the mapping table indicated by the MAC signaling is configured to represent a correspondence between a bit codepoint of a spatialrelationinfo domain in DCI signaling and the spatialrelationinfo activated by the MAC or provided by the RRC signaling.

In an example, when the MAC signaling indicates the mapping table, the mapping table is configured to represent a correspondence between spatialrelationinfo and X (X is 3) bits of a spatialrelationinfo indication domain in the DCI signaling. When the number of pieces of spatialrelationinfo configured by the RRC signaling is more than N (N may be 8), the mapping table is configured to represent a correspondence between the spatialrelationinfo activated by the MAC signaling and the X (X may be 3) bits of the spatialrelationinfo indication domain in the DCI signaling. When the number of the pieces of spatialrelationinfo configured by the RRC signaling is less than or equal to N (N may be 8), the mapping table is configured to represent a correspondence between the spatialrelationinfo configured by the RRC signaling and the X (X is 3) bits of the spatialrelationinfo indication domain in the DCI signaling.

In an example, assumed that the spatialrelationinfo of two panels configured by the RRC signaling are numbered together from 0 to 63. The N (N may be 8) pieces of spatialrelationinfo activated by the MAC signaling are spatialrelationinfo #3, spatialrelationinfo #8, spatialrelationinfo #13, spatialrelationinfo #15, spatialrelationinfo #16, spatialrelationinfo #19, spatialrelationinfo #21, and spatialrelationinfo #23, respectively. The N (N may be 8) pieces of spatialrelationinfo activated by the MAC signaling in an embodiment of the present disclosure is renumbered as 0-7, that is, spatialrelationinfo #3 is changed as spatialrelationinfo #0, spatialrelationinfo #8 is changed as spatialrelationinfo #1, spatialrelationinfo #13 is changed as spatialrelationinfo #2, spatialrelationinfo #15 is changed as spatialrelationinfo #3, spatialrelationinfo #16 is changed as spatialrelationinfo #4, spatialrelationinfo #19 is changed as spatialrelationinfo #5, spatialrelationinfo #21 is changed as spatialrelationinfo #6, spatialrelationinfo #23 is changed as spatialrelationinfo #7.

In an embodiment of the present disclosure, some of N (N may be 8) pieces of spatialrelationinfo activated by the MAC signaling correspond to panel #1 and some of that correspond to panel #2. The MAC signaling is configured to indicate the mapping table for representing the correspondence between N (N may be 8) pieces of spatialrelationinfo activated and X-bit (X=3) codepoints of the spatialrelationinfo domain in the DCI signaling.

Table 1 shows an illustrative mapping table indicated by an MAC signaling provided by an embodiment of the present disclosure.

TABLE 1

| Spatialrelationinfo domain in DCI (such as 3-bit) | Spatialrelationinfo used |
|---|---|
| 000 | spatialrelationinfo #0 |
| 001 | spatialrelationinfo #4 |
| 010 | spatialrelationinfo #1 |
| 011 | spatialrelationinfo #5 |
| 100 | spatialrelationinfo #0 & spatialrelationinfo #4 |

TABLE 1-continued

| Spatialrelationinfo domain in DCI (such as 3-bit) | Spatialrelationinfo used |
| --- | --- |
| 101 | spatialrelationinfo #1 & spatialrelationinfo #5 |
| 110 | spatialrelationinfo #2 & spatialrelationinfo #6 |
| 111 | spatialrelationinfo #3 & spatialrelationinfo #7 |

In Table 1, of N (N may be 8) pieces of spatialrelationinfo activated by the MAC signaling, every M (M may be 4) pieces of spatialrelationinfo may be activated by each panel, or the N pieces of spatialrelationinfo may also be unequally divided. It may be understood that some bit codepoints corresponding to the DCI domain in Table 1 may indicate one piece of spatialrelationinfo, and some indicate two pieces of spatialrelationinfo. When the bit codepoints indicate two pieces of spatialrelationinfo, respective pieces of spatialrelationinfo correspond to different panels.

An embodiment of the present disclosure may adopt the mapping table shown in Table 1. When determining the one or more default uplink transmission beams, first, in the mapping table indicated by the MAC signaling, it is determined that spatialrelationinfo domain codepoints indicate one or more codepoints of more than one pieces of spatialrelationinfo. Or, it may be understood that the MAC signaling is required to indicate the mapping table when there is more than one pieces of spatialrelationinfo indicated by the codepoints. In an embodiment of the present disclosure, the codepoints for indicating a plurality of pieces of spatialrelationinfo are determined in the mapping table, and the minimum codepoint is determined among the codepoints for indicating the plurality of pieces of spatialrelationinfo, and one or more pieces of spatialrelationinfo among the plurality of pieces of spatialrelationinfo corresponding to the minimum codepoint is as the one or more default uplink transmission beams.

In an embodiment of the present disclosure, when there is one default uplink transmission beam, the default uplink transmission beam is a beam corresponding to a reference signal indicated by a first spatialrelationinfo among the plurality of pieces of spatialrelationinfo corresponding to the minimum codepoint. For example, in Table 1, codepoint 100, codepoint 101, codepoint 110, and codepoint 111 all correspond to the plurality of pieces of spatialrelationinfo, while codepoint 100 is the minimum codepoint, so one or two of spatialrelationinfo #0 and spatialrelationinfo #4 corresponding to codepoint 100 are the one or more default uplink transmission beams. When there is one default uplink transmission beam, spatialrelationinfo #0 is in the front, so spatialrelationinfo #0 is one default uplink transmission beam.

In another implementation, the default uplink transmission beam in an embodiment of the present disclosure may be determined based on one or more uplink transmission beams corresponding to one or more reception beams of a physical downlink control channel (PDCCH).

In an example, the reception beam for PDCCH and the transmission beam for uplink transmission are in a beam direction of a same panel. When there are a plurality of reception beams for PDCCH, the one or more default uplink transmission beams are the same as one or more transmission beams corresponding to one or more reception beams among the reception beams for PDCCH.

Further, in an embodiment of the present disclosure, the PDCCH for determining the default uplink transmission beam is a PDCCH that schedules uplink transmission corresponding to the default uplink transmission beam. Or the PDCCH for determining the default uplink transmission beam is a recently received PDCCH. Or the PDCCH for determining the default uplink transmission beam is a PDCCH sent in a control resource set with a minimum control resource set (CORESET) identifier.

In another implementation, the default uplink transmission beam in an embodiment of the present disclosure is determined based on one or more uplink transmission beams corresponding to a latest uplink transmission. In an example, the one or more default uplink transmission beams are the same as one or more of the transmission beams of the latest uplink transmission before the present uplink transmission. The present uplink transmission may be PUSCH transmission, a physical uplink control channel (PUCCH) or SRS transmission.

It may be understood that when configuring the uplink beam information in any of the above embodiments of the present disclosure, the uplink beam information configuration involved may include at least one of a cell ID, a transmission reception point (TRP) ID, a panel ID or a CORESET ID corresponding to the reference signal in addition to the corresponding reference signal.

In the method for data transmission provided by embodiments of the present disclosure, the one or more default uplink transmission beams of the terminal are determined. The one or more default uplink transmission beams of the terminal may be the spatialrelationinfo with the minimum numbering among the plurality of pieces of spatialrelationinfo configured by the one or more RRC signalings. Or the one or more default uplink transmission beams of the terminal may also be the spatialrelationinfo with the minimum numbering among the plurality of pieces of spatialrelationinfo activated by the one or more MAC signalings. Or the one or more default uplink transmission beams of the terminal may be, in the mapping table indicated by the MAC signaling, one or more pieces of spatialrelationinfo of the plurality of pieces of spatialrelationinfo corresponding to the minimum codepoint among the codepoints corresponding to the plurality of pieces of spatialrelationinfo. Or the one or more default uplink transmission beams of the terminal may be one or more uplink transmission beams corresponding to the one or more reception beams for PDCCH. Or the one or more default uplink transmission beams of the terminal may be the same as one or more uplink transmission beams among the transmission beams of the latest uplink transmission. By the above method of determining the default uplink transmission beam, the terminal and the network device may perform the data transmission based on the default uplink transmission beam, which may ensure the matching of the uplink transmission beam of the terminal and the uplink reception beam of the network device, ensure the accuracy of receiving the uplink transmission, and improve the throughput.

Based on the same concept, an embodiment of the present disclosure further provides an apparatus for data transmission.

It could be understood that, the apparatus for data transmission provided in an embodiment of the present disclosure contains hardware structures and/or software modules that execute various functions in order to implement the above functions. In combination with the modules and algorithm steps of the examples described in embodiments of the present disclosure, embodiments of the present disclosure may be implemented in the form of hardware or a combination of hardware and computer software. Whether a function is executed by hardware or computer software driven by hardware depends on the specific application and design constraints of the technical solution. Those skilled in the art may adopt different methods for each specific application to implement the described functions, but such implementation should not be considered as beyond the scope of the technical solutions of embodiments of the present disclosure.

Figure 3:
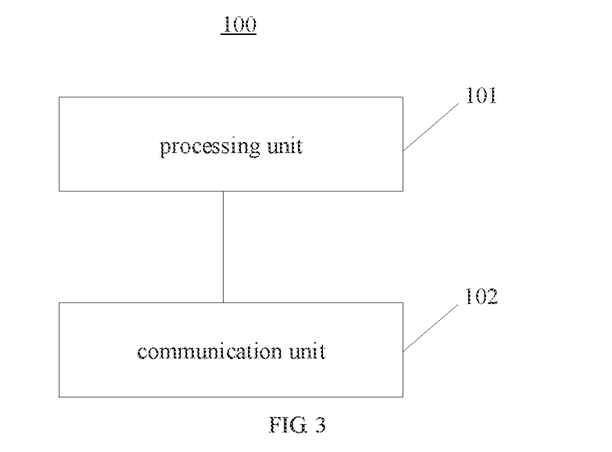
FIG. 3 is a block diagram illustrating an apparatus for data transmission according to an exemplary embodiment.

FIG. 3 is a block diagram illustrating an apparatus for data transmission according to an exemplary embodiment. As illustrated in FIG. 3, the apparatus 100 includes a processing unit 101 and a communication unit 102.

The processing unit 101 is configured to determine a default uplink transmission beam, in which the default uplink transmission beam includes one or more uplink transmission beams. The communication unit 102 is configured to perform data transmission based on the default uplink transmission beam.

In an implementation, the processing unit 101 determines the default uplink transmission beam by performing:

determining the default uplink transmission beam based on one or more transmission beams that correspond to one or more reference signals corresponding to one or more uplink beam information sets configured by one or more radio resource control (RRC) signalings; in which, the default uplink transmission beam has a correspondence with uplink beam information in the one or more uplink beam information sets.

In another implementation, a terminal includes a plurality of antenna panels, the plurality of antenna panels determine the default uplink transmission beam based on different uplink beam information sets configured by different RRC signalings; in which the default uplink transmission beam is one or more transmission beams that correspond to one or more reference signals corresponding to one or more pieces of uplink beam information in an RRC index-minimum uplink beam information set, in which the RRC index-minimum uplink beam information set includes one piece of uplink beam information with a minimum index in each of the uplink beam information sets.

In yet another implementation, a terminal includes a plurality of antenna panels, the plurality of antenna panels determine the default uplink transmission beam based on uplink beam information sets configured by a same RRC signaling; in which the default uplink transmission beam is one or more transmission beams that correspond to one or more reference signals corresponding to one or more pieces of uplink beam information with a minimum index configured by the RRC signaling In yet another implementation, the processing unit 101 determines the default uplink transmission beam by performing:

determining the default uplink transmission beam based on one or more transmission beams that correspond to one or more reference signals corresponding to one or more candidate uplink beam information sets activated by one or more media access control (MAC) signalings; in which the default uplink transmission beam has a correspondence with uplink beam information in the one or more candidate uplink beam information sets.

In yet another implementation, a terminal includes a plurality of antenna panels, the plurality of antenna panels determine the default uplink transmission beam based on different candidate uplink beam information sets respectively activated by different MAC signalings; in which the default uplink transmission beam is one or more transmission beams that correspond to one or more reference signals corresponding to one or more pieces of uplink beam information in an MAC index-minimum uplink beam information set, in which the MAC index-minimum uplink beam information set includes one piece of uplink beam information with a minimum index in each of the candidate uplink beam information sets.

In yet another implementation, a terminal includes a plurality of antenna panels, the plurality of antenna panels determine the default uplink transmission beam based on candidate uplink beam information sets activated by a same MAC signaling; in which the default uplink transmission beam is one or more transmission beams that correspond to one or more reference signals corresponding to one or more pieces of uplink beam information with a minimum index activated by the MAC signaling.

In yet another implementation, the processing unit 101 determines the default uplink transmission beam by performing:

determining the default uplink transmission beam based on one or more transmission beams that correspond to one or more reference signals corresponding to uplink beam information in a mapping table indicated by a MAC signaling, in which the uplink beam information in the mapping table is uplink beam information corresponding to a minimum codepoint among codepoints corresponding to a plurality of uplink beam information in the mapping table.

In yet another implementation, the processing unit 101 determines the default uplink transmission beam by performing:

determining the default uplink transmission beam based on one or more uplink transmission beams corresponding to one or more reception beams of a physical downlink control channel (PDCCH).

In yet another implementation, the reception beam and the uplink transmission beam are in a beam direction of a same antenna panel.

In yet another implementation, the PDCCH is a PDCCH that schedules uplink transmission corresponding to the default uplink transmission beam, or the PDCCH is a recently received PDCCH, or the PDCCH is a PDCCH in a control resource set with a minimum control resource set identifier.

In yet another implementation, the processing unit 101 determines the default uplink transmission beam by performing: determining the default uplink transmission beam based on one or more uplink transmission beams corresponding to a latest uplink transmission.

In yet another implementation, the uplink beam information includes spatial relation information, or a transmission configuration indication or an uplink transmission configuration indication.

In yet another implementation, a configuration of the uplink beam information includes at least one of a cell identifier, a transmission receiver identifier, an antenna panel identifier or a control resource set identifier.

With regard to the apparatus in the above embodiments, the specific way in which each module performs the operation has been described in detail in the embodiments of the method and will not be elaborated here.

Figure 4:
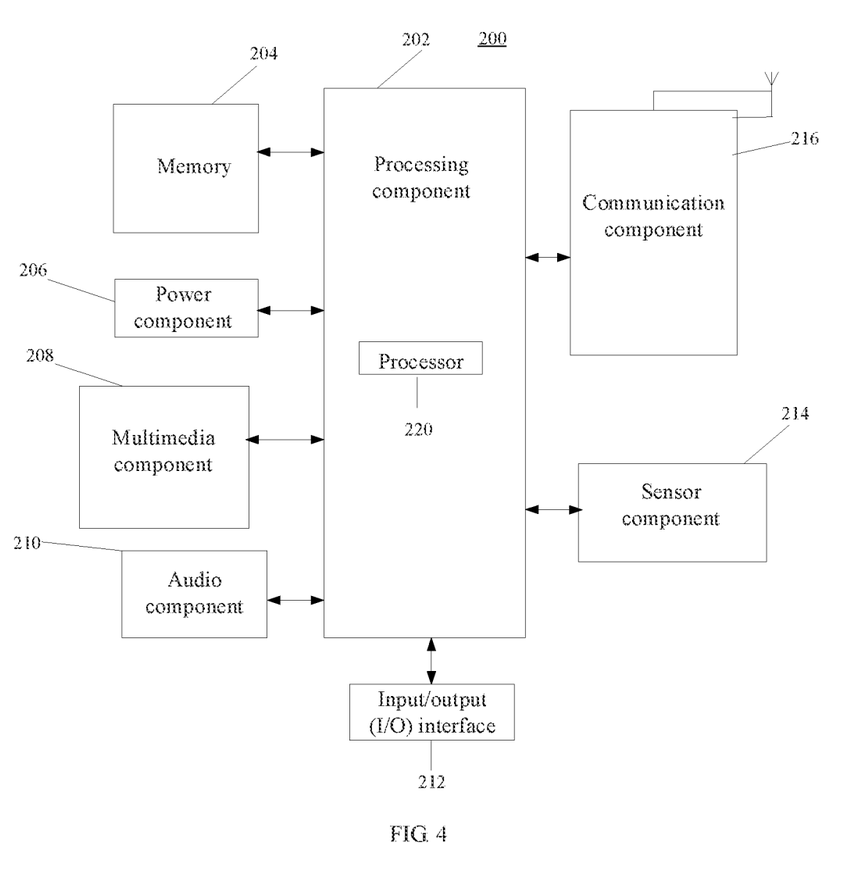
FIG. 4 is a block diagram illustrating an apparatus for data transmission according to an exemplary embodiment.

FIG. 4 is a block diagram illustrating an apparatus 200 for data transmission according to another exemplary embodiment. For example, the apparatus 200 may be a user equipment such as a mobile phone, a computer, a digital broadcasting terminal, a message transceiving equipment, a game console, a tablet equipment, a medical equipment, a fitness equipment, or a personal digital assistant.

As illustrated in FIG. 4, the apparatus 200 may include one or more of: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 may include one or more processors 202 for executing instructions to implement all or a part of the above method. Moreover, the processing component 202 may include one or more modules which facilitate the interaction between the processing component 202 and other components. For example, the processing component 202 may include a multimedia module to facilitate the interaction between the multimedia component 208 and the processing component 202.

The memory 204 is configured to store various types of data to support the operation of the apparatus 200. Examples of such data include instructions for any application or method operated on the apparatus 200 for performing contraction data, phonebook data, messages, pictures, video, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 206 is configured to provide power to various components of the apparatus 200. The power component 206 may include a power management system, one or more power sources, and any other components associated with the generation, management, and distribution of power in the apparatus 200.

The multimedia component 208 includes a screen providing an output interface between the apparatus 200 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 208 includes a front camera and/or a rear camera. When the apparatus 200 is in an operation mode, such as a shooting mode or a video mode, the front camera and/or the rear camera may receive external multimedia data. Each front camera and rear camera may be a fixed optical lens system or have a focal length and an optical zoom capability.

The audio component 210 is configured to output and/or input an audio signal. For example, the audio component 210 includes a microphone ("MIC") for receiving an external audio signal when the apparatus 200 is in an operation mode, such as a call mode, a recording mode, and a voice recognition mode. The received audio signal may be further stored in the memory 204 or transmitted via the communication component 216. In some embodiments, the audio component 210 further includes a speaker for outputting the audio signal.

The I/O interface 212 is configured to provide an interface between the processing component 202 and peripheral interface modules, such as a keyboard, a click wheel, buttons, and the like. These buttons may include, but be not limited to, a home button, a volume button, a start button, and a lock button.

The sensor component 214 includes one or more sensors for providing status assessments of various aspects of the apparatus 200. For example, the sensor component 214 may detect an open/closed state of the apparatus 200, relative positioning of components, e.g., the display and the keypad of the apparatus 200, a position change of the apparatus 200 or a component of the apparatus 200, a presence or absence of user contraction with the apparatus 200, an orientation or an acceleration/deceleration of the apparatus 200, and a temperature change of the apparatus 200. The sensor component 214 may include a proximity sensor configured to detect the presence of nearby objects without any physical contact. The sensor component 214 may also include an optical sensor, such as a CMOS or CCD image sensor, for use in an imaging application. In some embodiments, the sensor component 214 may also include an acceleration sensor, a gyro sensor, a magnetic sensor, a pressure sensor or a temperature sensor.

The communication component 216 is configured to facilitate communication, wired or wirelessly, between the apparatus 200 and other devices. The apparatus 200 may access a wireless network based on a communication standard, such as Wi-Fi, 2Q 3Q or a combination thereof. In an exemplary embodiment, the communication component 216 receives a broadcast signal or broadcast associated information from an external broadcast management system via a broadcast channel. In an exemplary embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer readable storage medium including instructions, such as the memory 204 including the instructions. The instructions may be executed by the processor 220 in the apparatus 200 for performing the above method. For example, the non-transitory computer readable storage medium may be a ROM, a RAM, a CD-ROM, a magnetic tape, a floppy disc, an optical data storage device, and the like.

Figure 5:
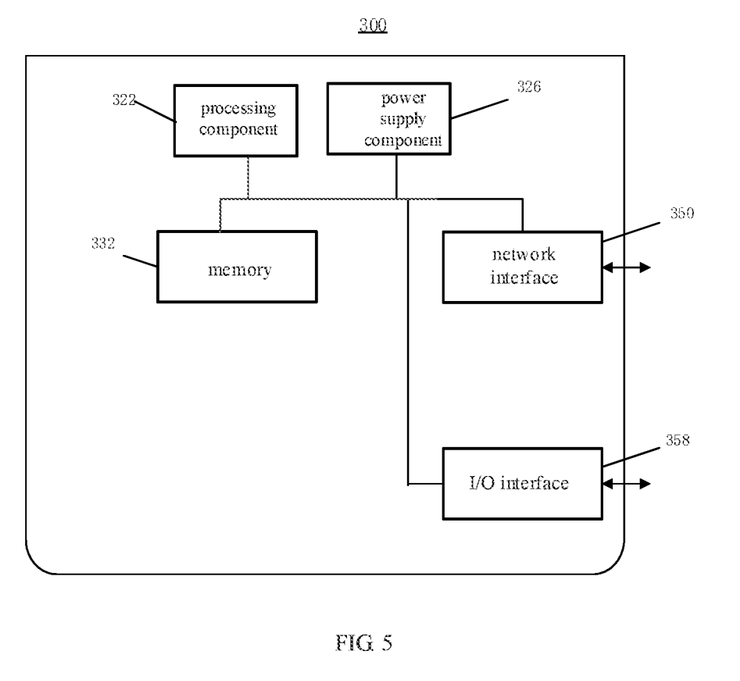
FIG. 5 is a block diagram illustrating an apparatus for data transmission according to an exemplary embodiment.

FIG. 5 is a block diagram illustrating an apparatus 300 for data transmission according to an illustrative embodiment. For example, the apparatus 300 may be provided as a network device. Referring to FIG. 5, the apparatus 300 includes a processing component 322, which further include one or more processors, and memory resources represented by the memory 332, which are configured to store instructions executed by the processing component 322, for example, an application. The applications stored in the memory 332 may include one or more modules each of which corresponds to a set of instructions. In addition, the processing component 322 is configured to execute instructions, to execute the method described above.

The apparatus 300 may further include one power supply component 326 configured to execute power management of the apparatus 300, and one wired or wireless network interface 350 configured to connect the apparatus 300 to a network, and one input/output (I/O) interface 358. The apparatus 300 may operate an operating system stored in the memory 332, for example, Windows Server™, Mac OS X™, Unix™, Linux™, FreeBSD™, or the like.

In an illustrative embodiment, a non-temporary computer-readable storage medium including instructions is also provided, such as a memory 332 including the instructions. The instructions may be executed by the processing component 322 of the apparatus 300 to complete the above method. For example, the non-temporary computer-readable storage medium may be a ROM, a random access memory (RAM), a CD-ROM, a tape, a floppy disk, an optical data storage device, and the like.

It may be further understood that, "a plurality of" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "said are also intended to include plural forms, unless the context clearly indicates otherwise.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for data transmission, comprising:
   determining a default uplink transmission beam, wherein the default uplink transmission beam comprises one or more uplink transmission beams; and
   performing data transmission based on the default uplink transmission beam;
   wherein determining the default uplink transmission beam comprises:
      determining the default uplink transmission beam based on one or more uplink transmission beams corresponding to one or more reception beams of a physical downlink control channel (PDCCH), wherein the one or more reception beams and the one or more uplink transmission beams corresponding to the one or more reception beams are in a beam direction of a same antenna panel.

2. The method according to claim 1, wherein determining the default uplink transmission beam comprises:
   determining the default uplink transmission beam based on one or more transmission beams that correspond to reference signals corresponding to one or more uplink beam information sets configured by one or more radio resource control (RRC) signalings;
   wherein the default uplink transmission beam has a correspondence with uplink beam information in the one or more uplink beam information sets.

3. The method according to claim 2, wherein a terminal comprises a plurality of antenna panels, the plurality of antenna panels determine the default uplink transmission beam based on different uplink beam information sets configured by different RRC signalings;
   wherein the default uplink transmission beam comprises one or more transmission beams that correspond to one or more reference signals corresponding to one or more pieces of uplink beam information in an RRC index-minimum uplink beam information set, wherein the RRC index-minimum uplink beam information set comprises one piece of uplink beam information with a minimum index in each of the uplink beam information sets.

4. The method according to claim 2, wherein a terminal comprises a plurality of antenna panels, the plurality of antenna panels determine the default uplink transmission beam based on uplink beam information sets configured by a same RRC signaling;
   wherein the default uplink transmission beam comprises one or more transmission beams that correspond to one or more reference signals corresponding to one or more pieces of uplink beam information with a minimum index configured by the RRC signaling.

5. The method according to claim 1, wherein determining the default uplink transmission beam comprises:
   determining the default uplink transmission beam based on one or more transmission beams that correspond to one or more reference signals corresponding to one or more candidate uplink beam information sets activated by one or more media access control (MAC) signalings;
   wherein the default uplink transmission beam has a correspondence with uplink beam information in the one or more candidate uplink beam information sets.

6. The method according to claim 5, wherein a terminal comprises a plurality of antenna panels, the plurality of antenna panels determine the default uplink transmission beam based on different candidate uplink beam information sets respectively activated by different MAC signalings;
   wherein the default uplink transmission beam comprises one or more transmission beams that correspond to one or more reference signals corresponding to one or more pieces of uplink beam information in an MAC index-minimum uplink beam information set, wherein the MAC index-minimum uplink beam information set comprises one piece of uplink beam information with a minimum index in each of the candidate uplink beam information sets.

7. The method according to claim 5, wherein a terminal comprises a plurality of antenna panels, the plurality of antenna panels determine the default uplink transmission beam based on candidate uplink beam information sets activated by a same MAC signaling;

wherein the default uplink transmission beam comprises one or more transmission beams that correspond to one or more reference signals corresponding to one or more pieces of uplink beam information with a minimum index activated by the MAC signaling.

8. The method according to claim 1, wherein determining the default uplink transmission beam comprises:
determining the default uplink transmission beam based on one or more transmission beams that correspond to one or more reference signals corresponding to uplink beam information in a mapping table indicated by a MAC signaling;
wherein the uplink beam information in the mapping table is uplink beam information corresponding to a minimum codepoint among codepoints corresponding to a plurality of pieces of uplink beam information in the mapping table.

9. The method according to claim 1, wherein the PDCCH is a PDCCH that schedules uplink transmission corresponding to the default uplink transmission beam, or the PDCCH is a recently received PDCCH, or the PDCCH is a PDCCH in a control resource set with a minimum control resource set identifier.

10. The method according to claim 2, wherein the uplink beam information comprises spatial relation information, or a transmission configuration indication or an uplink transmission configuration indication.

11. The method according to claim 2, wherein a configuration of the uplink beam information comprises at least one of a cell identifier, a transmission reception point identifier, an antenna panel identifier or a control resource set identifier.

12. An apparatus for data transmission, comprising:
a processor; and
a memory, configured to store instructions executable by the processor,
wherein the processor is configured to:
determine a default uplink transmission beam, wherein the default uplink transmission beam comprises one or more uplink transmission beams; and
perform data transmission based on the default uplink transmission beam;
wherein determining the default uplink transmission beam comprises:
determining the default uplink transmission beam based on one or more uplink transmission beams corresponding to one or more reception beams of a physical downlink control channel (PDCCH), wherein the one or more reception beams and the one or more uplink transmission beams corresponding to the one or more reception beams are in a beam direction of a same antenna panel.

13. A non-transitory computer-readable storage medium, when instructions stored in the storage medium are executed by a processor of a device, causing the device to:
determine a default uplink transmission beam, wherein the default uplink transmission beam comprises one or more uplink transmission beams; and
perform data transmission based on the default uplink transmission beam;
wherein determining the default uplink transmission beam comprises:
determining the default uplink transmission beam based on one or more uplink transmission beams corresponding to one or more reception beams of a physical downlink control channel (PDCCH), wherein the one or more reception beams and the one or more uplink transmission beams corresponding to the one or more reception beams are in a beam direction of a same antenna panel.

14. The apparatus according to claim 12, wherein the processor is further configured to:
determine the default uplink transmission beam based on one or more transmission beams that correspond to one or more reference signals corresponding to one or more uplink beam information sets configured by one or more radio resource control (RRC) signalings;
wherein the default uplink transmission beam has a correspondence with uplink beam information in the one or more uplink beam information sets.

15. The apparatus according to claim 12, wherein the processor is further configured to:
determine the default uplink transmission beam based on one or more transmission beams that correspond to one or more reference signals corresponding to one or more candidate uplink beam information sets activated by one or more media access control (MAC) signalings;
wherein the default uplink transmission beam has a correspondence with uplink beam information in the one or more candidate uplink beam information sets.

16. The apparatus according to claim 12, wherein the processor is further configured to:
determine the default uplink transmission beam based on one or more transmission beams that correspond to one or more reference signals corresponding to uplink beam information in a mapping table indicated by a MAC signaling;
wherein the uplink beam information in the mapping table is uplink beam information corresponding to a minimum codepoint among codepoints corresponding to a plurality of pieces of uplink beam information in the mapping table.

* * * * *